Feb. 16, 1937. G. TRÖMEL 2,070,697
PROCESS FOR PRODUCING FERTILIZERS
Filed Feb. 19, 1936
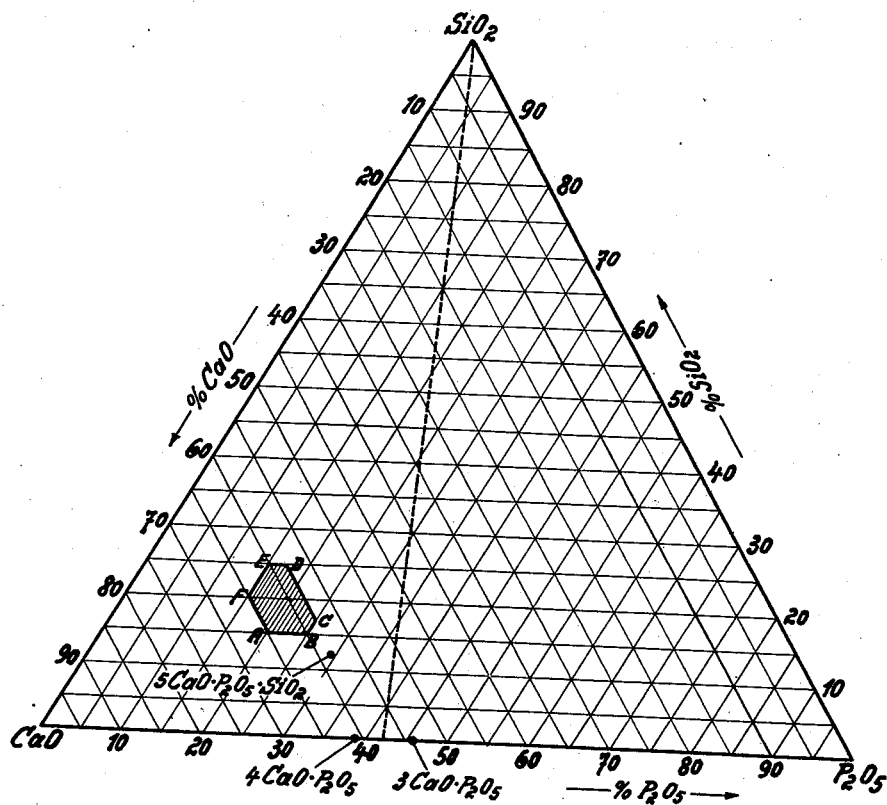
Inventor:
G. Trömel
By W. E. Evans
Attorney:

Patented Feb. 16, 1937

2,070,697

UNITED STATES PATENT OFFICE 2,070,697

PROCESS FOR PRODUCING FERTILIZERS

Gerhard Trömel, Dusseldorf, Germany, assignor to Kaiser-Wilhelm-Institute fur Eisenforschung (eingetragener Verein), Dusseldorf, Germany Application February 19, 1936, Serial No. 64,660
In Germany March 26, 1935

3 Claims. (Cl. 71—47)

Endeavours have long been made to convert, by calcination, the phosphoric acid contained in natural raw phosphates—occurring as apatite,

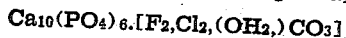
$Ca_{10}(PO_4)_6.[F_2,Cl_2,(OH_2,)CO_3]$ into a condition assimilable by plants, numerous processes having been suggested for attaining that object. A common feature of all these proposals is the use of high temperature to which the raw phosphates, in association with various added substances, and with or without the presence of steam, are subjected.

With regard to the kind of such additions, these may be divided into two groups. In the one, alkali compounds, such as carbonates, sulphates or chlorides, in addition to silicic acid, or also lime, are used. To some extent alkali-bearing rocks or minerals, such as phonolite, leucite or the like are also used. In the processes concerned the formation of an alkali-lime phosphate characterizes the course of the reaction, which therefore implies decomposition by means of alkalis. By such a process, the so-called "Rhenania" phosphate is obtained, this being produced by calcining raw phosphate with alkalis at temperatures up to about 1150° C.

In the case of the second group, on the other hand, the endeavour is to avoid the large additions of alkali compounds, which make the product more costly, and to decompose the raw phosphates with the aid of silicic acid—in the form of sand or the like—or solely with the aid of alkaline earths, such as lime or the like. To some extent lime and silicic acid are used together, it having been proposed to fuse, along with the raw phosphate, sufficient lime and silicic acid to ensure the formation of the compound $5CaO.P_2O_5.SiO_2$. This process however has not met with success. It is true that this compound dissolves readily in citric acid or solutions of ammonium citrate; nevertheless there is no noteworthy amount of the compound formed from natural raw phosphates under manufacturing conditions.

In decomposing raw phosphates by calcination without alkali it is important that fluorine should be largely eliminated by the formation of volatile compounds; so long as fluorine is present it forms compounds of the apatite type, which are practically insoluble. The attempts hitherto made to expel the fluorine have failed in practice chiefly for two reasons. In the first place, my more recent researches have shown that, in expelling the fluorine in a volatile form, a state of equilibrium is established between the solid and the gaseous phase, so that, even at temperatures of 1400–1500° C., the expulsion is by no means complete. Moreover the expulsion of the fluorine, in operating on a commercial scale, is impeded by the circumstance that the transition of fluorine from the solid to the gaseous phase practically ceases when the phosphate becomes strongly sintered. Sintering chiefly occurs when the phosphate is calcined at temperatures above 1300 to 1350° C., because the fluorine acts as a flux, so that incrustations, which greatly obstruct working, or finally arrest it completely, are formed in the furnace. Moreover the resulting clinker is so hard that it cannot be reduced except by the application of very considerable power.

These two reasons form the chief explanation why the decomposition of raw phosphate—for example in shaft furnaces or rotary-tube furnaces—has hitherto met with no success on a commercial scale, although the decomposition on a laboratory scale has been declared practicable by various publications. This agrees with the statements in a recently published article in Industrial and Engineering Chemistry, vol. 27 (1935), January issue, page 89, according to which the decomposition can be effected in the use of charges of about 2.5 grms., whereas, in the case of quantities of about 10 grms., no decomposed product was obtained.

Scientific researches with the ternary system, lime—phosphoric acid—silicic acid, have already revealed the existence of another compound, formed of these three components and also displaying very good solubility in citric acid and citrate. This is the compound $9CaO.P_2O_5.3SiO_2$.

It has been found that on adding lime and silicic acid to raw phosphate, in such quantities as approximately to allow the formation of the compound referred to, the phosphoric acid in the raw phosphates readily decomposes, on a commercial scale, by simple calcination. This is quite unexpected by anyone skilled in the art, especially because—as already mentioned—there is no appreciable decomposition when raw phosphate is mixed with lime and silicic acid in such quantities as will produce the compound $5CaO.P_2O_5.SiO_2$, and the mixture is then calcined on a commercial scale.

The reaction mixture made up in accordance with the invention behaves on calcination—for example in the rotary-tube furnace—in a manner entirely different from the previously proposed mixtures. No sintering occurs, and in any event no lumps or incrustation is formed in the furnace, but a non-caking, loose powder is produced during the further course of the reaction, even if the mixture adheres temporarily to the walls at certain points. In any case the fact is that, on issuing from the furnace, the reaction mixtures according to the invention made from fluorine-bearing raw phosphates, lime and silicic acid, furnish a product which is practically unsintered, but consists of fine-grained, readily friable material, which is almost completely soluble in citric acid. This fact is evidently connected with the circumstance that the fluorine content of the product is below 0.1%, that is to say, an amount that is barely detectable.

The reasons for the behaviour of the mixture according to the invention are not yet quite clear. Of considerable importance is apparently the fact that the compound consisting of lime, silicic acid and phosphoric acid, formed in accordance with the invention, has a very high fusing point, above 1750° C. Moreover the compound according to the invention seems to be distinguished by a high speed of formation in the solid mixture and below the fusing point. This reaction is manifestly accompanied by a considerable increase in volume, which explains the change of the mass into the loose, pulverulent condition. Moreover the large quantities of silicic acid used in the ratio according to the invention appears to facilitate the expulsion of the fluorine in the volatile state. In any event, however this may be, the specified mixture ratio enables the decomposition of fluorine-bearing raw phosphate, by calcination, to be effected, for the first time, in the usual technical furnaces on a commercial scale, and a product to be obtained that is up to 100% soluble in citric acid.

The temperatures to be employed according to the invention may rise to about 1450° C. Although the use of high temperatures would be possible it is by no means necessary, because a completely soluble product is already obtained. The length of the reaction period varies, as will be understood, with the dimensions of the furnace, the amount of the charge, and the temperature employed. In experimental working on a small scale a perfectly satisfactory result can be obtained in 1–2 hours, but in the case of very large furnaces possibly periods of 5–6 hours or more can be used. In contrast to other processes, the manner of cooling has no substantial influence on the solubility of the product, and therefore the cooling may be quick or gradual, according to requirements.

The compound according to the invention, that is, $9CaO.P_2O_5.3SiO_2$, has a certain range of homogeneity in the ternary system, that is to say, it can take up one or more of its components while at the same time forming mixed crystals. The limits within which the aforesaid compound—or a compound with the formula $16CaO.2P_2O_5.5SiO_2$ which has the same properties—is exclusively or predominantly formed lie, in the case of CaO, between 58 and 65%; for $P_2O_5$, between about 15–25%, and for $SiO_2$, at 15–25%.

The drawing represents the ternary system $CaO$—$P_2O_5$—$SiO_2$, so far as is necessary for the better comprehension of the invention. The hatched area A—B—C—D—E—F represents the ground within which the compound according to the invention occurs, in the pure state or with formation of mixed crystals, in the pure ternary system. The limits coincide with those specified in the claim.

The drawing clearly reveals the difference between the compound claimed in the application and the compound $5CaO.P_2O_5.SiO_2$. On the binary side, $CaO$—$P_2O_5$, two points are given, corresponding to the compounds $4CaO.P_2O_5$ and $3CaO.P_2O_5$. In raw phosphates, the ratio of lime to phosphoric acid lies, as a rule, between these two compounds. Hence if—as has often been proposed—silicic acid be added to raw phosphates, the composition will be modified in approximate accordance with the broken line leading to the $SiO_2$ angle of the diagram. Compounds differing widely from those intended according to the invention are thus obtained.

It will be understood that these limit values refer to pure substance, leaving impurities out of consideration. In carrying out the process according to the present invention the composition of the original mixture depends on the composition of the raw materials, it being necessary to take into account the losses of $H_2O$, $CO_2$ and $SiF_4$ during calcination. The most suitable means for characterizing the compound in question is its Röntgen diagram, since it is distinguished by a definite crystalline structure.

The following is an example of the carrying out of the process according to the invention:

A Florida pebble phosphate containing 30.7% of $P_2O_5$ was ground with 866 parts of limestone and 235 parts of silversand to a degree of fineness of flour of raw cement. This mixture was heated in an oil heated rotary furnace of the length of 7.56 m. and an internal diameter of 0.7 m., until a temperature of 1450° C. is reached. A test made on the product showed a content of 17.7% of $P_2O_5$. In a 2% citric acid 17.6% of $P_2O_5$ was soluble, while in an ammoniacal solution of ammonium citrate according to Petermann, 16.2% of $P_2O_5$ was soluble. An X-ray photograph of the product confirmed the presence of the characteristic crystalline structure of the compound

$$9CaO.P_2O_5.3SiO_2$$

and

$$16CaO.2P_2O_5.5SiO_2$$

Although in carrying out the Rhenania process described above an alkali-lime compound is obtained exhibiting the same crystalline structure, there nevertheless exists between them a decided difference inasmuch as, with the Rhenania process, a compound is formed containing approximately 1 mole of $Na_2O$ or $K_2O$, per 1 mole of $P_2O_5$, whereas the present compound requires practically no alkali for its formation.

The requisite lime is advantageously added in the form of calcium carbonate, limestone or the like, and the silicic acid as sand or the like. However, calcium oxide itself, or any other calcium compound forming oxide on calcination, may be used. Moreover, calcium oxide and silicic acid already combined as calcium silicate, or slags chiefly consisting thereof, may also be used. It is highly advisable to use raw phosphates such as are, in themselves, already rich in the substances (lime and silicic acid) to be added.

In the process according to the invention low contents, that is to say up to 10%, of alumina, ferric oxide, magnesium oxide, or the like, present in the original materials, have no influence on the course of the reaction or the quality of the end product. As it is well known in this art, alumina and ferric oxide are adapted to replace silicic acid, whilst magnesium oxide can be used, up to 10%, in place of lime. The alumina contents in the original materials can be rendered useful, in this manner, for the course of the reaction according to the invention; for example, when blast-furnace slag is used as an addition, in the process according to the invention.

In the present process the original substances are advantageously well mixed together prior to their introduction into the furnace. This can be done, for example, by the wet or dry method by grinding together.

In carrying out the process, it is also advisable to operate in an atmosphere of steam, in known manner.

I claim:

1. A process for producing fertilizers on a commercial scale, by calcining raw phosphate with lime and silicic acid, at temperatures up to about 1450° C., characterized by adjusting the relative proportions of raw phosphate, lime and silicic acid in the mixture so that the calcined product contains about 58–65% of CaO, about 15–25% of $P_2O_5$ and about 15–25% of $SiO_2$.

2. A process for producing fertilizers on a commercial scale, by calcining raw phosphate with lime and silicic acid, at temperatures up to 1450° C., characterized by adjusting the relative proportions of raw phosphate, lime and silicic acid in the mixture, so that compounds with the formula $16CaO.2P_2O_5.5SiO_2$ are obtained.

3. A process for producing fertilizers on a commercial scale, by calcining raw phosphate with lime and silicic acid at temperatures up to 1450° C., characterized by adjusting the relative proportions of raw phosphate, lime and silicic acid in the mixture, so that compounds with the formula $9CaO.P_2O_5.3SiO_2$ are obtained.

GERHARD TRÖMEL.